(12) United States Patent
Pansare et al.

(10) Patent No.: US 12,542,944 B1
(45) Date of Patent: Feb. 3, 2026

(54) COMMON THUMBNAILS PER CONTENT SOURCE FOR USE ACROSS UNIQUE STREAMING SESSIONS

(71) Applicant: Charter Communications Operating, LLC, St. Louis, MO (US)

(72) Inventors: Moin Pansare, Aurora, CO (US); Sachin Reddy Kota, Indian Land, SC (US); Vipul Patel, Parker, CO (US); Fabio Hux, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/905,288

(22) Filed: Oct. 3, 2024

(51) Int. Cl.
| | |
|---|---|
| *H04N 21/266* | (2011.01) |
| *H04N 21/2187* | (2011.01) |
| *H04N 21/231* | (2011.01) |
| *H04N 21/234* | (2011.01) |
| *H04N 21/242* | (2011.01) |

(52) U.S. Cl.
CPC ....... *H04N 21/266* (2013.01); *H04N 21/2187* (2013.01); *H04N 21/231* (2013.01); *H04N 21/23418* (2013.01); *H04N 21/242* (2013.01)

(58) Field of Classification Search
None
See application file for complete search history.

(56) References Cited

U.S. PATENT DOCUMENTS

| | | | |
|---|---|---|---|
| 10,102,881 B2 | 10/2018 | Elsner | |
| 11,089,373 B2 | 8/2021 | Chittella et al. | |
| 11,310,567 B2 | 4/2022 | Hardin et al. | |
| 11,714,850 B2 * | 8/2023 | Tripathi | H04N 21/234363 386/241 |
| 2006/0064716 A1 * | 3/2006 | Sull | G06F 16/784 715/201 |
| 2012/0005628 A1 * | 1/2012 | Isozu | H04N 21/8153 715/838 |
| 2013/0145395 A1 * | 6/2013 | Jeong | H04N 5/50 725/40 |
| 2014/0053202 A1 * | 2/2014 | Selim | H04N 21/47202 725/44 |
| 2014/0259056 A1 * | 9/2014 | Grusd | H04N 21/23439 725/34 |
| 2019/0228230 A1 * | 7/2019 | Onuma | H04N 21/2187 |
| 2020/0037046 A1 | 1/2020 | Hardin et al. | |

\* cited by examiner

*Primary Examiner* — James R Marandi
(74) *Attorney, Agent, or Firm* — Young Basile Hanlon & MacFarlane, P.C.

(57) ABSTRACT

Methods, devices, and systems for providing common thumbnails per content source for use across multiple streaming sessions. A method for common thumbnails usage includes pre-generating, by a linear packager, thumbnails for a live stream from a content source, wherein each thumbnail has a thumbnail time and name, sending, by a streaming system, thumbnail synchronization information associated with the thumbnails in response to a stream request received from a client for the content source, and sending, by the streaming system to the client, a requested thumbnail during the stream, wherein the requested thumbnail is selected from the thumbnails using a name based on the thumbnail synchronization information.

26 Claims, 8 Drawing Sheets

COMMON THUMBNAILS PER CONTENT SOURCE FOR USE ACROSS UNIQUE STREAMING SESSIONS

TECHNICAL FIELD

This disclosure relates to media or content (collectively "media") streaming. More specifically, this disclosure relates to thumbnail processing in media streaming.

BACKGROUND

Streaming is a method and system of delivering media from a source point, device, or system to an end-user or subscriber over the Internet, for example. Streaming systems include linear packagers which process input media and prepare output media streams for access by media players. The linear packagers can use a variety of streaming techniques to process and format the output media streams. For example, Dynamic Adaptive Streaming over Hypertext Transfer Protocol (HTTP) (DASH) and HTTP Live Streaming (HLS) are adaptive bitrate streaming techniques which enable high quality streaming of media over the Internet delivered from conventional HTTP web servers. Both of these techniques break the input media into a sequence of small segments for delivery over the HTTP web servers. Streaming can include, but is not limited to, live streaming, time shifted live streaming, recorded playback streaming, video on demand (VOD) streaming, cloud digital video recorder (cDVR) streaming, Pause-Live-TV (PLTV) streaming, in progress recording streaming, and/or combinations thereof. In this instance, the time shifted live streaming, recorded playback streaming, VOD streaming, cDVR streaming, PLTV streaming, and/or in progress recording streaming (which are end-user induced or controlled delays in contrast to network, infrastructure, transmission, and/or related delays) can be referred to as post-live streaming, non-live streaming and/or delayed streaming (collectively "non-live streaming") in contrast to live streaming.

Video thumbnails are images that act as preview images for the streaming media when an end-user, for example, moves or positions a slider button on a seek bar. During live streaming, live stream segments and playlists associated with the live stream are common for all end-users served from the same origin or source server. During non-live streaming, end-users can pause/seek anywhere within their non-live stream and seek/jump to any position within the non-live stream using the seek bar. Consequently, it is crucial to include thumbnails that are accurately represent the position on the seek bar. This can enhance end-user engagement behavior. However, for some or most forms of non-live streaming, the segments and playlists delivered to each end-user are unique, i.e., they are not stored per source but are rather stored per session. For example, in PLTV and/or cDVR streaming, the manifests delivered to each user is unique. In addition, the content of the segments delivered to each user is unique. In these instances, two different users can start their recording at different points in time and when they do, the start time of their recording is used as the playback start time (which starts with 0 for each user). This results in the same thumbnail occurring at different points in terms of playback for each user. The simplest implementation to accomplish this would be to have unique thumbnails delivered to each end-user. This means that there would be unique request Uniform Resource Locator (URLs) as well as unique bytes for the thumbnail payloads being delivered to each of the end-users. There are many disadvantages to this approach. One disadvantage is that it would eliminate content delivery network (CDN) caching efficiency. Another disadvantage is that it would result in unnecessary processing to generate these thumbnails for millions of requests. Moreover, it would require additional storage.

SUMMARY

Disclosed is a system and method for generating, providing, or using common thumbnails per content source for use across multiple streaming sessions.

In implementations, a method for common thumbnails usage includes pre-generating, by a linear packager, thumbnails for a live stream from a content source, wherein each thumbnail has a thumbnail time and name, sending, by a streaming system, thumbnail synchronization information associated with the thumbnails in response to a stream request received from a client for the content source, and sending, by the streaming system to the client, a requested thumbnail during the stream, wherein the requested thumbnail is selected from the thumbnails using a name based on the thumbnail synchronization information.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
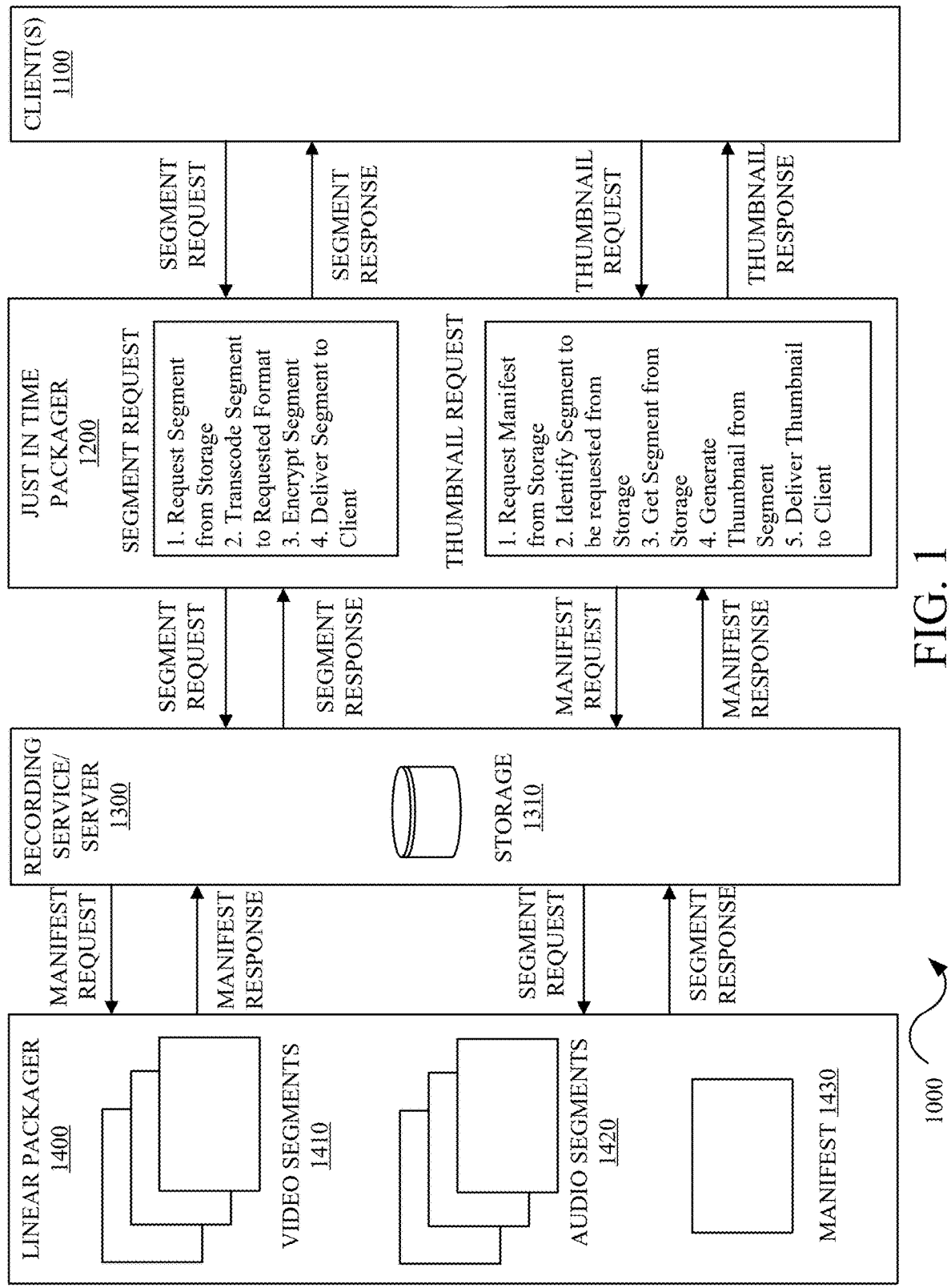
FIG. 1 is a diagram of a streaming system.

Reference will now be made in greater detail to embodiments, examples of which are illustrated in the accompanying drawings. Wherever possible, the same reference numerals will be used throughout the drawings and the description to refer to the same or like parts.

As used herein, the terminology "server", "computer", "computing device or platform", or "cloud computing system" includes any unit, or combination of units, capable of performing any method, or any portion or portions thereof, disclosed herein. For example, the "server", "computer", "computing device or platform", or "cloud computing system" may include at least one or more processor(s).

As used herein, the terminology "processor" or "processing circuitry" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory and hardware that is hard-wired into the processing circuitry.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the term "memory" includes one or more memories, where each memory may be a computer-readable medium. A memory may encompass memory hardware units (e.g., a hard drive or a disk) that store data or instructions in software form. Alternatively or in addition, the memory may include data or instructions that are hard-wired into processing circuitry. The memory may include a single memory unit or multiple joint or disjoint memory units, which each of the multiple joint or disjoint memory units storing all or a portion of the data described as being stored in the memory.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, e-commerce transactions, media players, scheduling, management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure and claims. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

FIG. 1 is a diagram of a streaming system 1000. The streaming system 1000 can include, but is not limited to, one or more clients or client devices 1100 associated with end-users, a just-in-time packager 1200, a recording service/server 1300, and a linear packager 1400. The recording service/server 1300 can include, but is not limited to, a storage 1310. The linear packager 1400 can operate on input media from a source point, device, or system to generate video segments 1410, audio segments 1420, and a manifest 1430. In this instance, the input media is treated as a common live stream input, and the video segments 1410 and the audio segments 1420 are common live segments. The recording service/server 1300 can store the video segments 1410, the audio segments 1420, and the manifest 1430 for use in non-live streaming via the just-in-time packager 1200, for example.

Operationally, an end-user can send, via the client 1100, a streaming and/or segment request for a media stream. The client 1100 can send the segment request to the just-in-time packager 1200. For the segment request, the just-in-time packager 1200 can send the segment request to the recording service 1300 and/or the storage 1310, which in turn can send a segment response to the just-in-time packager 1200. The just-in-time packager 1200 can transcode the segment to a requested format, encrypt the transcoded segment, and send the encrypted segment to the client 1100.

Operationally, an end-user can send, via the client 1100, a thumbnail request for a media stream. The client 1100 can send the thumbnail request to the just-in-time packager 1200. For the thumbnail request, the just-in-time packager 1200 can send the manifest request to the recording service 1300 and/or the storage 1310, which in turn can send a manifest response to the just-in-time packager 1200. The just-in-time packager 1200 can use the manifest 1430 to identify a segment to be requested from the recording service 1300 and/or the storage 1310. The just-in-time packager 1200 can send a segment request to the recording service 1300 and/or the storage 1310 for the identified segment, which in turn can send a segment response to the just-in-time packager 1200. The just-in-time packager 1200 can generate a thumbnail from the segment. The just-in-time packager 1200 can send a thumbnail response to the client 1100. As stated, this can be processing inefficient and requires excess storage.

Described herein are devices, systems, and methods for providing common thumbnails per content source for use across multiple streaming sessions. In implementations, a mechanism is provided herein which can use common thumbnails across unique recorded and in-progress streaming sessions (e.g., non-live streaming sessions) per source. In implementations, the mechanism can be used to provide common thumbnails for live streaming sessions. In implementations, the mechanism can enable generation of the common thumbnails per source from common live segments associated with the source. In implementations, naming of the common thumbnails can follow a common naming and/or numbering structure and/or identifier per source. This can enable derivation of the common identifier using individual playback timing elements per session on that source.

In implementations, thumbnails for a source are pre-generated with respect to a live stream and stored. The pre-generated thumbnails can be labeled using thumbnail synchronization information or thumbnail generation timing elements. That is, the pre-generated thumbnails can have common names that can be retrieved by clients with respect to different streams by using some form of the thumbnail synchronization information or thumbnail generation timing elements.

All or a portion of the thumbnail synchronization information or thumbnail generation timing elements can be provided to a client via metadata in the manifest or using an application programming interface (API) call. The client can then identify a thumbnail that is in synchronization with the stored pre-generated thumbnails. The mechanism permits use of one set of thumbnails per source.

In implementations, the devices, systems, and methods can identify, locate, name, and index exact same points on different streams (e.g., sessions) utilizing a same source. This can enable pre-generation of the thumbnails from the linear packager. This can reduce the amount of storage required for all different sessions on the same source since only a single copy of the thumbnails are maintained which are shared across all the end-users. Moreover, this can reduce the amount of compute and computational resources which might have been required to perform similar repeated operations across all end-user sessions. In addition, as the naming convention follows a fixed format which can be shared across all end-user sessions, caching mechanisms of a CDN can be used effectively to provide an efficient thumbnail delivery process.

Figure 2:
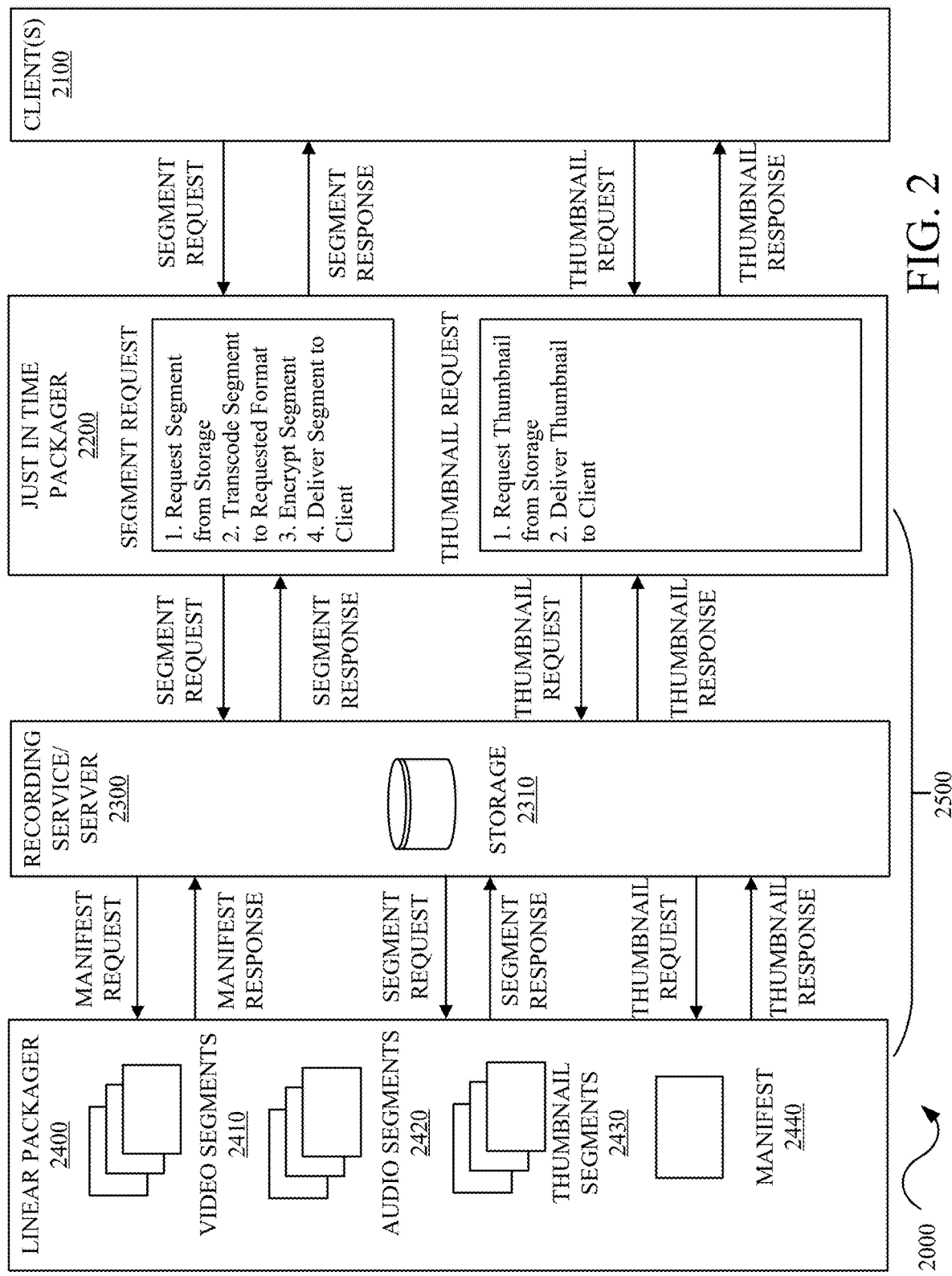
FIG. 2 is a diagram of an example streaming system in accordance with embodiments of this disclosure.

FIG. 2 is a diagram of an example streaming system 2000 in accordance with embodiments of this disclosure. The streaming system 2000 can include, but is not limited to, one or more clients or client devices 2100 associated with end-users, a just-in-time packager 2200, a recording service/server 2300, and a linear or live stream packager 2400. The recording service/server 2300 can include, but is not limited to, a storage 2310. In implementations, the just-in-time packager 2200, the recording service/server 2300, and the linear packager 2400 can be in a service provider system 2500. The number of components shown herein are illustrative and there may be more or less in the streaming system 2000. The streaming system 2000 and the components therein may include other elements which may be desirable or necessary to implement the devices, systems, and methods described herein. However, because such elements and steps do not facilitate a better understanding of the disclosed embodiments, a discussion of such elements and steps may not be provided herein.

In implementations, the one or more clients or client devices 2100 can include, but is not limited to, streaming devices, streaming applications, mobile phones, smart televisions, computing devices, and like devices. An end-user can use the one or more clients or client devices 2100 to send streaming and/or segment request(s) to stream media from a source via the just-in-time packager 2200, the recording service/server 2300, the linear packager 2400, and/or combinations thereof. The one or more clients or client devices 2100 can receive requested segment(s) and a manifest. The end-user can use the one or more clients or client devices 2100 to send thumbnail request(s) with respect to the media stream as described herein.

In implementations, the just-in-time packager 2200 can receive the streaming and/or segment request(s) from the one or more clients or client devices 2100. The just-in-time packager 2200 can request the segment from the recording service/server 2300 and/or storage 2310, transcode the received segment into a requested format, encrypt the transcoded segment, and the deliver the encrypted segment to the one or more clients or client devices 2100. In implementations, the just-in-time packager 2200 can receive thumbnail request(s) from the one or more clients or client devices 2100. The just-in-time packager 2200 can request the thumbnail from the recording service/server 2300 and/or storage 2310 and the deliver the thumbnail to the one or more clients or client devices 2100.

In implementations, the recording service/server 2300 and/or the storage 2310 can store the video segments 2410, the audio segments, 2420, the thumbnail segments 2430, and the manifest 2440 from the linear packager 2400 and for access by the just-in-time packager 2200. The recording service/server 2300 and/or the storage 2310 can store the video segments 2410, the audio segments 2420, the thumbnail segments 2430, and the manifest 2440 for use in non-live streaming, including for use in thumbnail processing, via the just-in-time packager 2200, for example. In implementations, the recording service/server 2300 and/or the storage 2310 can store the thumbnail segments 2430 for use in thumbnail processing for live streaming via the just-in-time packager 2200, for example.

In implementations, the linear packager 2400 can operate on input media from a source point, device, or system to generate the video segments 2410, the audio segments 2420, the thumbnail segments 2430, and the manifest 2440. In this instance, the input media is treated as a common live stream input, and the video segments 2410 and the audio segments 2420 are common live segments. In implementations, the manifest 2440 can include, but is not limited to, thumbnail synchronization information and/or timing information as described herein, a listing of media segment entries for the video segments 2410 and the audio segments 2420, file formats, encryption information, and/or other like information. In implementations, the thumbnail synchronization information and/or timing information can be provided as metadata in the manifest 2440. In implementations, the thumbnail synchronization information and/or timing information can be provided via an API call.

In implementations, the linear packager 2400 can generate the thumbnail segments 2430 using the video segments 2410, the audio segments 2420, and/or associated playlists. For the reasons stated herein, the linear packager 2400 can use EPOCH time (i.e., 1 Jan. 1970 00:00:00.000 GMT) as a stream anchor time. This can also be referred to as Playlist@StartTime for the ABR playlist. The linear packager 2400 can base a playback position in terms of time elapsed from EPOCH time. For example, if the playback stream (e.g., a non-live stream) starts on 22 Jul. 2024 20:40:25.414, then the first segment position and/or time would be 1721680825.414 seconds. That is, the stream anchor time or reference time is used to set a common basis.

In implementations, the linear packager 2400 can use the stream anchor time for the thumbnail generation process. The linear packager 2400 can use the first segment position and/or time and a defined thumbnail interval (i.e., the duration between 2 thumbnails) to generate thumbnails. In implementations, the thumbnail interval is a multiple of the segment duration. In implementations, the thumbnail interval is 10.01 seconds.

To enable thumbnail synchronicity across multiple playback sessions of a common source and/or enable common thumbnail identifiers/identification, the thumbnail generation process doesn't start at the very first segment (i.e., the beginning of the stream), but at an offset from the first segment position and/or time. The offset (thumbnail offset) enables calculation of a thumbnail resource identifier, thumbnail identifier, and/or thumbnail index using the stream anchor time and makes it independent of the stream timing or segment positioning across sessions utilizing the same source. When a client on an individually recorded session and/or playback session is requesting a thumbnail, the client needs to also calculate and utilize this offset value along with the playback positioning value to generate an accurate thumbnail identifier or thumbnail index.

In the absence of this offset during the thumbnail generation or retrieval process, the thumbnail identifiers or indexes would not match and represent the accurate frames across the sessions. To illustrate this issue, consider a use-case where offset is not utilized from the first segment position and/or time. That is, the thumbnail generation process begins from the first segment in the live stream, i.e., the first segment position and/or time. Table 1 shows live stream positions (could also be shown using times) and associated indices.

TABLE 1

| Position | 0 | 10.01 | 20.02 | 30.03 |
|---|---|---|---|---|
| Index | 1 | 2 | 3 | 4 |

Now assume two recording or playback streams which start at 2.6 and 8.1 seconds, respectively, in relation to the live stream start time. This is shown in Tables 2 and 3.

TABLE 2

| Position | 2.6 | 12.61 | 22.62 | 32.63 |
|---|---|---|---|---|
| Index | 1 | 2 | 3 | 4 |

TABLE 3

| Position | 8.1 | 18.11 | 28.12 | 38.13 |
|---|---|---|---|---|
| Index | 1 | 2 | 3 | 4 |

In the above examples, it is noted that the position and index generated for the two playback streams (Tables 2 and 3) do not match up with the actual values in the live stream (Table 1). As a result, retrieval of an accurate thumbnail in response to an end-user position on a seek bar is not assured. The use of the offset normalizes the references to be exactly the same. The offset can be determined using the first segment position and/or time and the thumbnail interval as shown in Equation (1):

$$\text{OffsetFromStart} = (\text{ThumbnailInterval} - (\text{StreamStartTime} \% \text{ThumbnailInterval})) \% \text{ThumbnailInterval} \quad \text{Equation (1)}$$

where the "%" operator indicates a modulo operation.

Figure 2A:
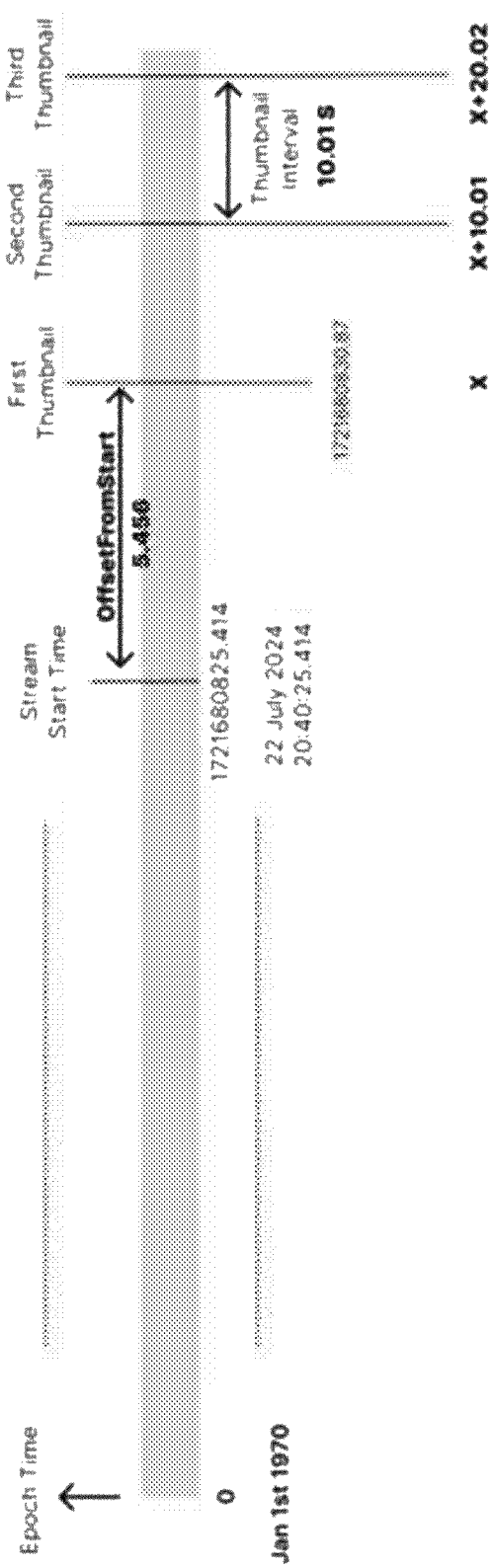
FIG. 2A is a diagram of an example timing and/or synchronization diagram in accordance with embodiments of this disclosure.

Equation (1) expresses that addition of the offset (OffsetFromStart) to the first segment position and/or time (StreamStartTime) would result in perfect alignment of a first thumbnail position and/or time with a multiple of the thumbnail interval. Subsequent thumbnails can then be generated at the thumbnail interval from the first thumbnail position and/or time. The relationships between the stream anchor time, the stream start time, the offset, the first thumbnail time, and the subsequent thumbnail times are further illustrated in FIG. 2A.

In an illustrative example, assume:
Sample Stream StartTime: 1721680825.414
Sample ThumbnailInterval: 10.01
Insert values into Equation (1):

$$\text{OffsetFromStart} = (10.01 - (1721680825.414 \% 10.01)) \% 10.01$$

=(10.01−4.554)% 10.01

=5.456 seconds

Then the first thumbnail position and/or time is:

FirstThumbnailPosition=StartPosition+OffsetFromStart

=1721680825.414+5.456

=1721680830.87

Then the subsequent thumbnails can be generated from the first thumbnail position and/or time as shown in Table 4:

TABLE 4

|  | First Thumbnail Position | First Thumbnail Position + 10.01 | First Thumbnail Position + 20.02 | First Thumbnail Position + 30.03 |
| --- | --- | --- | --- | --- |
| Position | 1721680830.87 | 1721680840.88 | 1721680850.89 | 1721680860.9 |
| Index | 1 | 2 | 3 | 4 |

In implementations, each of the thumbnails and/or thumbnail times and/or positions can be given a name based on either a time reference similar to $TIME$ from MPEG DASH or a calculated index similar to $NUMBER$ from MPEG DASH specification. For a time reference based name, a truncated version of the thumbnail time and/or something similar can be used as file names. For an index based name, Equation (2) can be used to formulate a matching index sequence:

$$\text{FirstThumbnailNumber}=(\text{FirstThumbnailPosition}/\text{ThumbnailInterval})+1 \quad \text{Equation (2)}$$

Inserting the example values above:

FirstThumbnailNumber=(FirstThumbnailPosition/ThumbnailInterval)+1

=(1721680830.87/10.01)+1

=171996087+1

=171996088

The remaining index names for the corresponding thumbnails are shown in Table 5:

TABLE 5

| Position | Thumbnail Index |
| --- | --- |
| 1721680830.87 | 171996088 |
| 1721680840.88 | 171996089 |
| 1721680850.89 | 171996090 |

Using the above equations, the linear packager 2400 can determine the thumbnail position and/or time, and a name, either time-based or index-based, for each thumbnail in the live stream. The linear packager 2400 can generate a manifest which includes at least the first thumbnail position and/or time and the corresponding name, and the thumbnail interval (this can be referred to as one form of thumbnail synchronization or timing information). The linear packager 2400 can store the manifest in the storage 2310, which can then be accessed by the just-in-time packager 2200 in response to a non-live streaming request, for example. The just-in-time packager can 2200 send the manifest to the client, which in turn can read the manifest once and calculate all thumbnail positions and indices on the fly. In implementations, the thumbnail synchronization information and/or timing information can be provided via an API call. Although the description herein is with respect to a non-live session or a non-live streaming request illustrative example, the devices and/or methods can be used by a client to request and receive thumbnails for a live session.

The client 2100, for a playback, recorded, or non-live session or streaming request (collectively "non-live session"), needs to be able to retrieve a thumbnail(s) selected by the end-user using the client 2100. To establish synchronicity between the live stream and the non-live session, some level of form of thumbnail synchronization or timing information can be sent by the linear packager 2400 via an API call or the manifest to the client 2100. Each form of the thumbnail synchronization or timing information includes at least the thumbnail interval and an offset-based parameter.

In implementations, the linear packager 2400 can store the thumbnail interval, the first thumbnail index, and the first thumbnail position and/or time for use by the client 2100. That is, the thumbnail interval, the first thumbnail index, and the first thumbnail position and/or time can be sent, for example, by the just-in-time packager 2200 in response to a non-live stream request. In implementations, a manifest, an API call, and/or combinations thereof can be used to provide this information. In this instance, the first thumbnail position and/or time is the offset-based parameter as it is based on an offset value. In this instance, the client 2100 can subtract a first thumbnail position and/or time from the non-live starting position and/or time. The subtraction result can be divided by the thumbnail interval to determine a non-live first thumbnail position and/or time. The client 2100 can then determine the live stream thumbnail index for an end-user selected thumbnail position and/or time. The client 2100 can send the determined live stream thumbnail index to the just-in-time packager 2200, which can retrieve the live stream thumbnail index from the storage 2310 and send it to the client 2100. This approach eliminates the necessity of reading the contents of the playlist from the application layer as that tends to be resource intensive.

In implementations, the client 2100 can receive the thumbnail interval (as retrieved from storage 2310) and the Playlist@StartTime, which indicates when the non-live session started. In this instance, the Playlist@StartTime is the offset-based parameter since it can be used to determine the offset and normalize all calculations between the common live stream and a non-live stream/session. Returning back to Equation (1) and rewriting, the client based version is shown in Equation (3):

$$\text{OffsetFromStart}=(\text{ThumbnailInterval}-(\text{Playlist@StartTime \% ThumbnailInterval})) \% \text{ThumbnailInterval} \quad \text{Equation (3)}$$

In an illustrative example, assume

PLAYLIST@ST=22 Jul. 2024 21:33:04.744=1721683984.744

Substituting the above and the thumbnail interval into Equation (3):

OffsetFromStart=(10.01−(1721683984.744% 10.01))% 10.01

=9.286

Substituting the above into a client based version of first thumbnail position:

FirstThumbnailPosition=PLAYLIST@ST+OffsetFromStart

=1721683984.744+9.286

=1721683994.03

Substituting the above into a client based version of Equation (2):

FirstThumbnailNumber=(FirstThumbnailPosition/ThumbnailInterval)+1

=(1721683994.03/10.01)+1

=171996403+1

=171996404

In this illustrative example, the FirstThumbnailPosition is 3163.16 seconds (or exactly 316 thumbnails) ahead of the live stream first thumbnail position. This value is a multiple of the thumbnail interval (in this example, 10.01). In order words, the FirstThumbnailPosition lies exactly on a thumbnail interval boundary. This assures synchronization between the live stream and non-live streams. This confirms that the non-live stream follows the same timing and indexing conventions of the live stream. The client 2100 can send the determined live stream thumbnail index to the just-in-time packager 2200, which can retrieve the live stream thumbnail index from the storage 2310 and send it to the client 2100.

In another illustrative example, assume:

PLAYLIST@ST=23 Jul. 2024 20:33: 32.795=1721766812.795 seconds

Making the appropriate substitutions:

OffsetFromStart=(ThumbnailInterval−(Playlist@StartTime % ThumbnailInterval)) % ThumbnailInterval

=(10.01−(1721766812.795% 10.01))% 10.01

=3.975 and

FirstThumbnailPosition=PLAYLIST@ST+OffsetFromStart

=1721766812.795+3.975

=1721766816.77 and

FirstThumbnailNumber=(FirstThumbnailPosition/ThumbnailInterval)+1

=(1721766816.77/10.01)+1

=172004678

In this illustrative example, the FirstThumbnailPosition is 85985.9 seconds (or exactly 8590 thumbnails) ahead of the live stream first thumbnail position. The FirstThumbnailPosition is also a multiple of the thumbnail interval and lies exactly on the thumbnail interval boundary. Again, the client 2100 can send the determined live stream thumbnail index to the just-in-time packager 2200, which can retrieve the live stream thumbnail index from the storage 2310 and send it to the client 2100.

Figure 3:
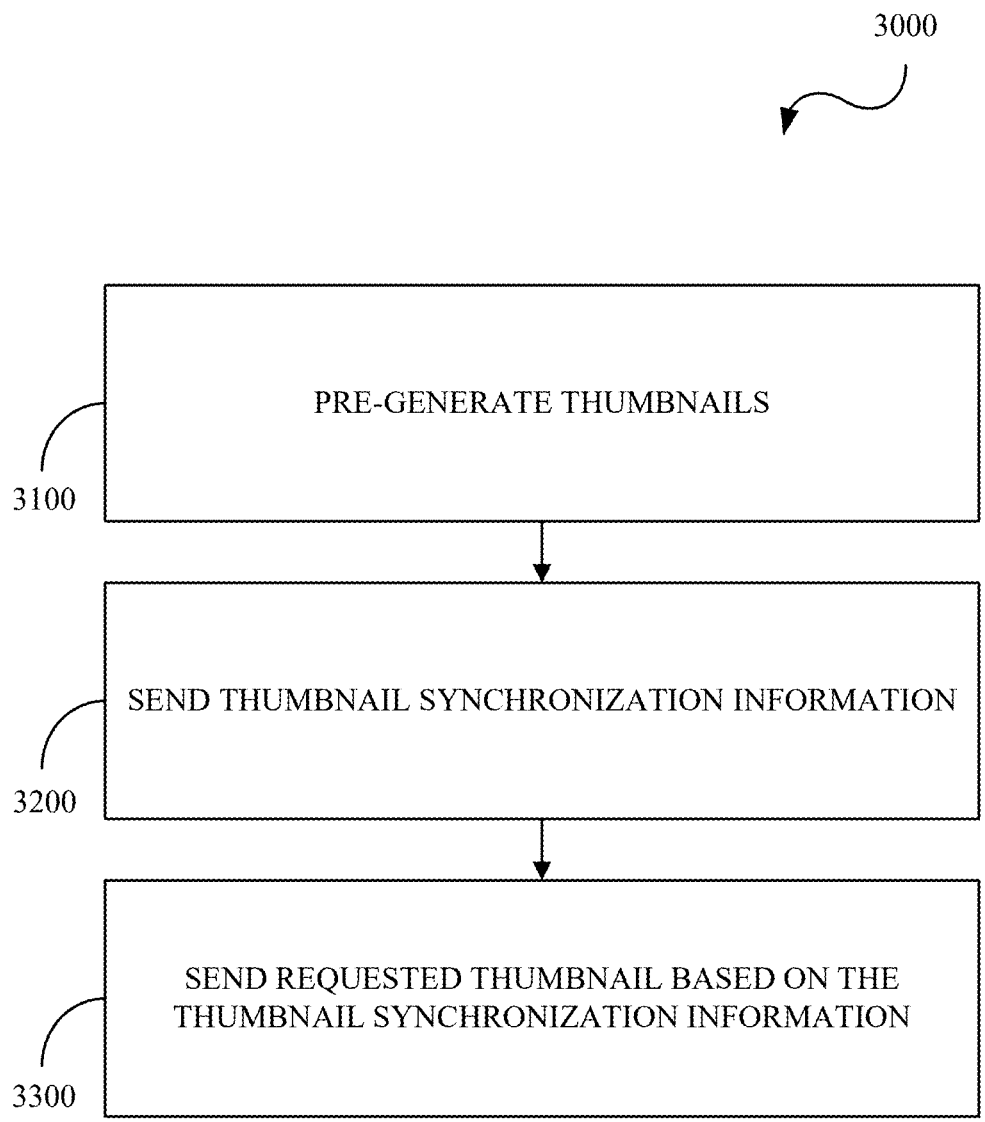
FIG. 3 is a flowchart of an example method for common thumbnail processing in accordance with embodiments of this disclosure.

FIG. 3 is a flowchart of an example method 3000 for common thumbnail processing in accordance with embodiments of this disclosure. The method 3000 includes: pre-generating 3100 thumbnails; sending 3200 thumbnail synchronization information; and sending 3300 requested thumbnail name based on the thumbnail synchronization information. The method 3000 can be implemented, for example, in or by components described with respect to FIGS. 2 and 7 and in conjunction with any of the flows described with respect to FIGS. 4-6, as appropriate and applicable.

Figure 4:
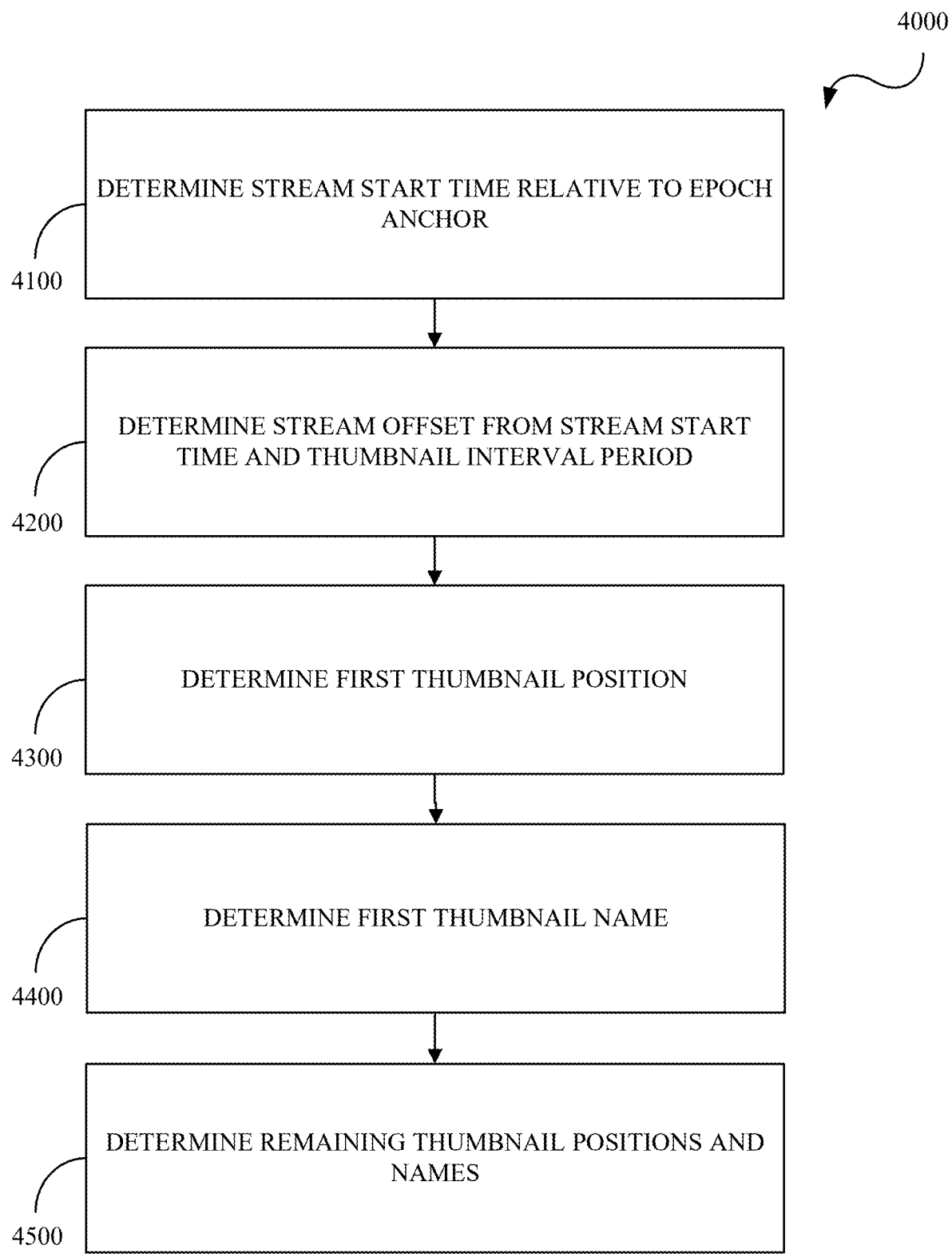
FIG. 4 is a flowchart of an example method for common thumbnail processing in accordance with embodiments of this disclosure.

The method 3000 includes pre-generating 3100 thumbnails. In implementations, a packager can determine a live stream offset for a live stream originating from a source. The live stream offset is based on a live stream start time and a defined thumbnail interval. Reference is now also made to FIG. 4. The live stream start time is determined relative to a reference time (4100). In implementations, the reference time is epoch time as defined by or for Unix epoch. The live stream offset can be determined by applying a modulo operation to the live stream start time using the defined thumbnail interval (4200). The resultant value is subtracted from the defined thumbnail interval to determine the live stream offset. The packager can determine, for a first thumbnail for the live stream (i.e., a live stream first thumbnail), a first thumbnail position and/or time based on adding the live stream offset to the live stream start time (4300). The packager can generate a name corresponding to first thumbnail position and/or time (4400). The packager can generate subsequent thumbnail positions and/or times using the defined thumbnail interval and the first thumbnail position and/or time for subsequent thumbnails and can generate names corresponding to each of the thumbnails (4500). In implementations, the naming convention can be based on a position or time of the thumbnail or an index based on the thumbnail position and the defined thumbnail interval. In implementations, the thumbnails are pre-generated thumbnails in that they are generated by the packager using the live stream and/or segments associated with the live stream. That is, the thumbnails are not generated based on requests for non-live streaming and thumbnails. In implementations, the packager is a linear packager. In implementations, the packager is a packager which operates on and/or process live streams to generate segments in contrast to non-live streams.

The method 3000 includes sending 3200 thumbnail synchronization information. In implementations, the packager can generate and store a manifest which includes thumbnail synchronization or timing information. In implementations, the thumbnail synchronization or timing information can be metadata in the manifest. In implementations, the thumbnail synchronization or timing information can include at least an offset-based parameter and a thumbnail interval. In implementations, the thumbnail synchronization or timing information can include a live stream first thumbnail position, a live stream thumbnail name, and a thumbnail interval. In implementations, the thumbnail synchronization or timing information can be sent by the streaming system and/or a just-in-time packager, via the manifest, an API call, and/or combinations thereof, in response to a streaming request. In implementations, the streaming request can be a non-live streaming request. In implementations, the streaming request can be a live streaming request.

The method 3000 includes sending 3300 a requested thumbnail based on the thumbnail synchronization information. A client can use the thumbnail synchronization or timing information to determine a thumbnail position and name for an end-user requested thumbnail. In implementations, the client can use the method described in FIG. 5. In implementations, the client can send the determined thumbnail name to the streaming system and/or just-in-time packager. The just-in-time packager can select and retrieve the requested thumbnail (from storage) from among the pre-generated thumbnails based on the received determined thumbnail name. In implementations, the client can use the method described in FIG. 6. In implementations, the client can send the determined thumbnail name to the streaming system and/or just-in-time packager. The just-in-time packager can retrieve the requested thumbnail based on the received determined thumbnail.

Figure 5:
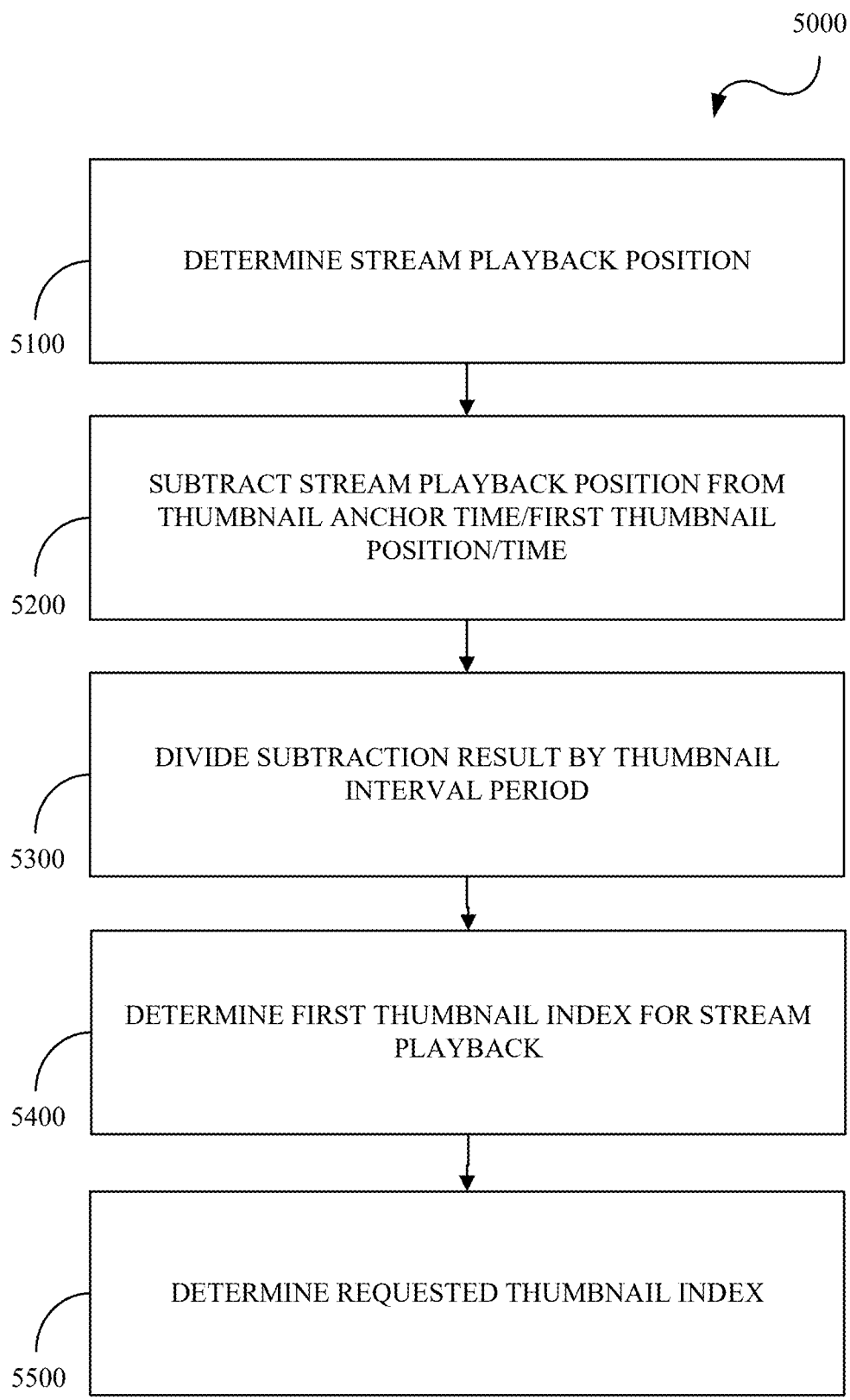
FIG. 5 is a flowchart of an example method for common thumbnail processing in accordance with embodiments of this disclosure.

FIG. 5 is a flowchart of an example method 5000 for common thumbnail processing in accordance with embodiments of this disclosure. In implementations, the thumbnail synchronization or timing information can include a live stream first thumbnail position, a live stream thumbnail name, and a thumbnail interval. The method 5000 includes: determining 5100 a stream start or playback position; subtracting 5200 the stream start or playback position from the live stream first thumbnail position; dividing 5300 subtraction result by the thumbnail interval; determining 5400 the first thumbnail index; and determining 5500 a requested thumbnail index. The method 5000 can be implemented, for example, in or by components described with respect to FIGS. 2 and 7 and in conjunction with any of the flows described with respect to FIGS. 3, 4, and 6, as appropriate and applicable.

Figure 6:
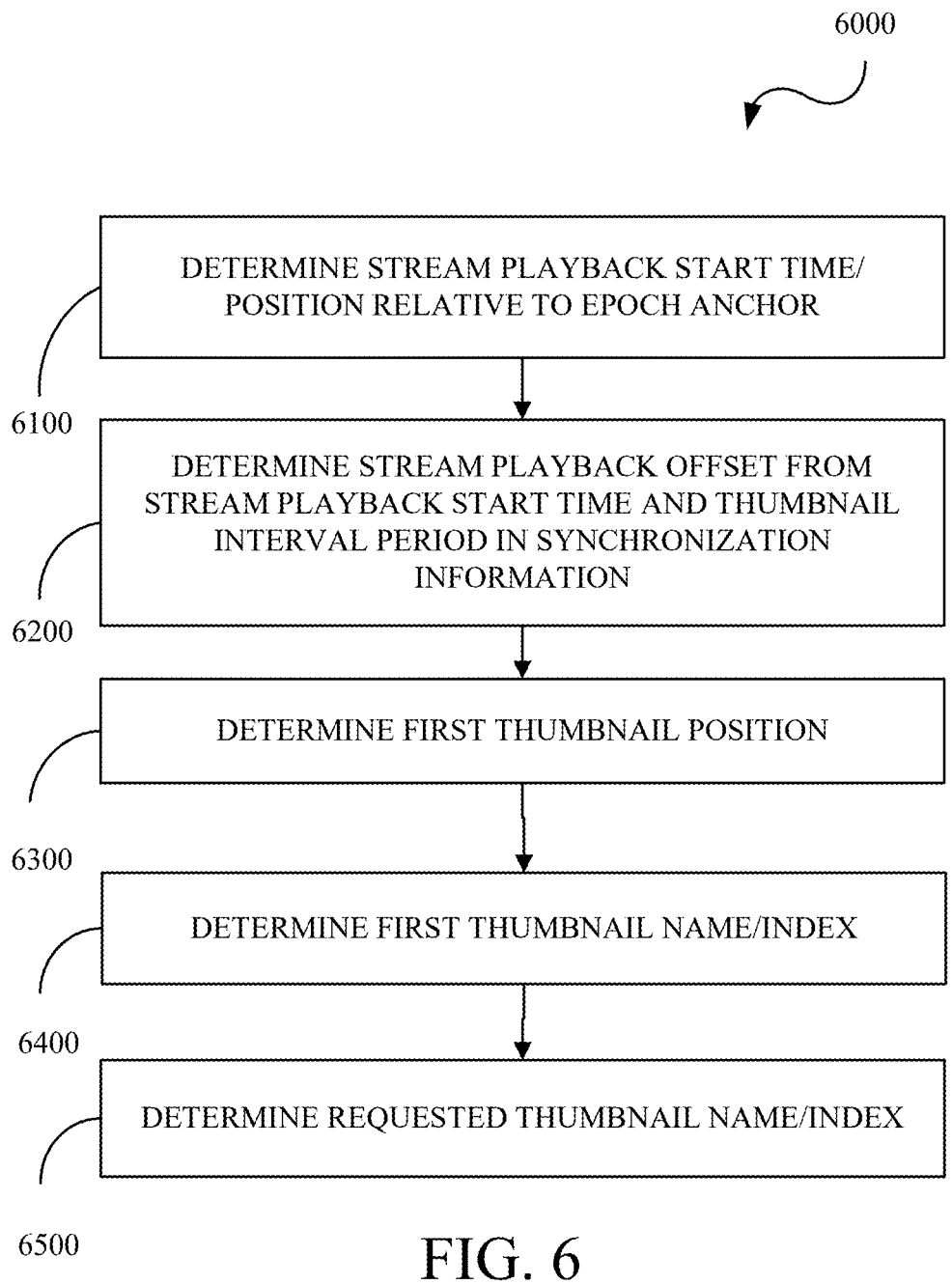
FIG. 6 is a flowchart of an example method for common thumbnail processing in accordance with embodiments of this disclosure.

FIG. 6 is a flowchart of an example method 6000 for common thumbnail processing in accordance with embodiments of this disclosure. In implementations, the thumbnail synchronization or timing information can include a thumbnail interval and access to a stream or playback start time associated with a stream request. The method 6000 is a variation of the method 4000 described herein and applicable, as appropriate. The method 6000 includes: determining 6100 a stream start time relative to a reference time; determining 6200 a stream offset by applying a modulo operation to the stream start time using the thumbnail interval; determining 6300 a first thumbnail position; determining 6400 a first thumbnail index; and determining 6500 a requested thumbnail index. The method 6000 can be implemented, for example, in or by components described with respect to FIGS. 2 and 7 and in conjunction with any of the flows described with respect to FIGS. 3-5, as appropriate and applicable.

Figure 7:
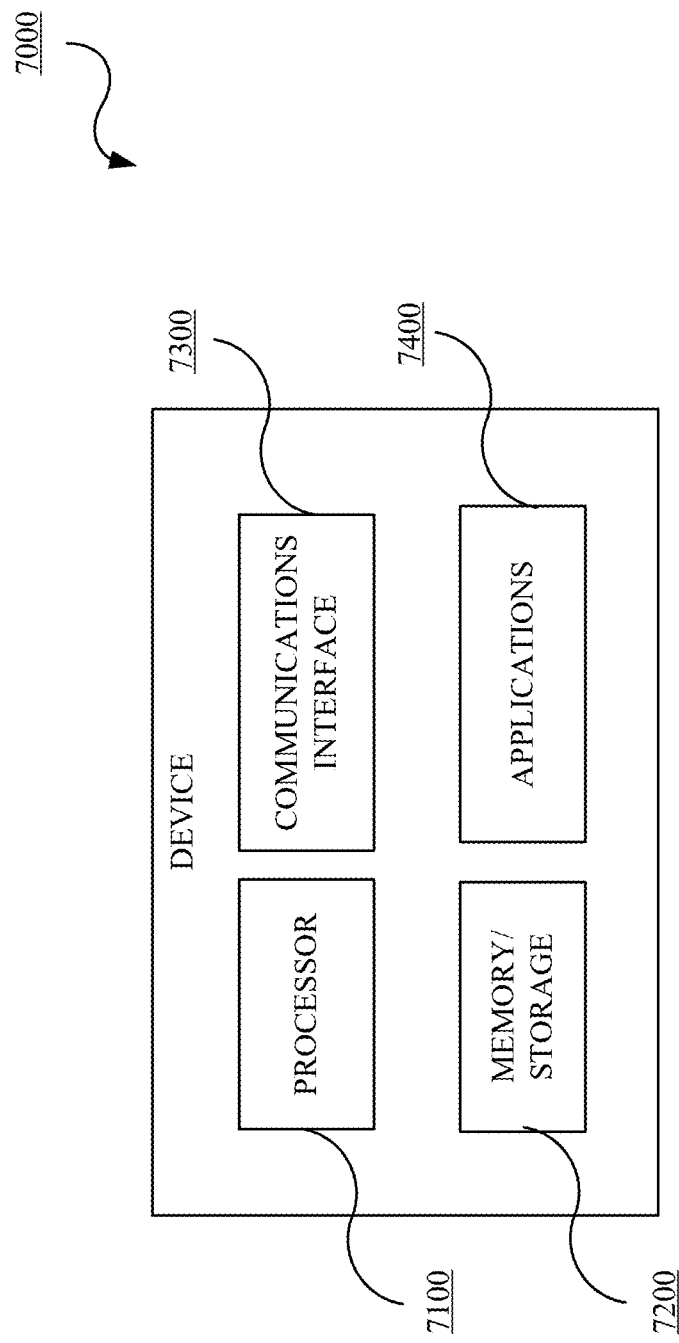
FIG. 7 is a block diagram of an example of a device in accordance with embodiments of this disclosure.

FIG. 7 is a block diagram of an example of a device 7000 in accordance with embodiments of this disclosure. The device 7000 may include, but is not limited to, a processor 7100, a memory/storage 7200, a communication interface 7300, and applications 7400. The device 8000 may include or implement, for example, the systems and components described with respect to FIG. 2 and the implement the methods of FIGS. 3-6. The applicable or appropriate flows, techniques, or methods described herein may be stored in the memory/storage 7200 and executed by the processor 7100 in cooperation with the memory/storage 7200, the communications interface 7300, and the applications 7400, as appropriate. The device 7000 may include other elements which may be desirable or necessary to implement the devices, systems, and methods described herein. However, because such elements and steps do not facilitate a better understanding of the disclosed embodiments, a discussion of such elements and steps may not be provided herein.

Disclosed is a method for generating, providing, or using common thumbnails per content source for use across multiple streaming sessions. In implementations, a method for common thumbnails usage includes pre-generating, by a linear packager, thumbnails for a live stream from a content source, wherein each thumbnail has a thumbnail time and name, sending, by a streaming system, thumbnail synchronization information associated with the thumbnails in response to a stream request received from a client for the content source, and sending, by the streaming system to the client, a requested thumbnail during the stream, wherein the requested thumbnail is selected from the thumbnails using a name based on the thumbnail synchronization information.

In implementations, the method further includes determining, by the linear packager, a live stream offset based on a live stream start time and a thumbnail interval, determining, by the linear packager, a first thumbnail time based on the live stream offset for a first thumbnail of the thumbnails, and determining, by the linear packager, a first thumbnail name corresponding to the first thumbnail time, where the thumbnail synchronization information includes the first thumbnail time, the first thumbnail name, and the thumbnail interval. In implementations, the method further includes determining, by the linear packager, the live stream start time relative to a reference time. In implementations, the thumbnail synchronization information includes an offset-based parameter and a thumbnail interval. In implementations, the offset-based parameter is a live stream offset which is based on a live stream start time and the thumbnail interval. In implementations, the offset-based parameter is a stream start time associated with the stream request. In implementations, the thumbnail synchronization information is sent via a manifest. In implementations, the thumbnail synchronization information is sent via an application programming interface (API) call. In implementations, the requested thumbnail is determined by determining a stream start time associated with the stream request, subtracting the stream start time from a first thumbnail time sent in the thumbnail synchronization information, dividing a subtraction result by a thumbnail interval sent in the thumbnail synchronization information, determining a first thumbnail name associated with the stream request, and determining the name for the requested thumbnail based on the first thumbnail name associated with the stream request. In implementations, the requested thumbnail is determined by determining a stream start time associated with the stream request relative to a reference time, determining a stream offset based on the stream start time associated with the stream request and a thumbnail interval sent in the thumbnail synchronization information, determining a first thumbnail position associated with the stream request based on the stream offset and the stream start time associated with the stream request, determining a first thumbnail name associated with the stream request for the first thumbnail position associated with the stream request, and determining the name for the requested thumbnail based on the first thumbnail name associated with the stream request.

Disclosed is a system for generating, providing, or using common thumbnails per content source for use across multiple streaming sessions. In implementations, a streaming system includes a live stream packager configured to pre-generate thumbnails for a live stream of content, a storage configured to store the pre-generated thumbnails, wherein each thumbnail has a thumbnail time and name, and a just-in-time packager configured to send, in response to receiving a request for a session for the content from a client, thumbnail timing elements associated with the thumbnails, and send, to the client, a requested thumbnail during the session, the requested thumbnail selected from the stored pre-generated thumbnails using a name based on the thumbnail timing elements.

In implementations, the live stream packager further configured to determine an offset based on a start time for the live stream and a thumbnail interval, determine, for a first thumbnail of the pre-generated thumbnails, a first thumbnail position based on the offset, and determine a first thumbnail name corresponding to the first thumbnail position, where the thumbnail timing elements includes the first thumbnail position, the first thumbnail name, and the thumbnail interval. In implementations, the live stream packager further configured to determine the start time relative to a reference time. In implementations, the thumbnail timing elements includes an offset-based parameter and a thumbnail interval. In implementations, the offset-based parameter is an offset which is based on a live stream start time and the thumbnail interval. In implementations, the offset-based parameter is a start time associated with the session. In implementations, the thumbnail timing elements are sent via a manifest. In implementations, the thumbnail timing elements are sent via an application programming interface (API) call. In implementations, where the client is configured to determine a session start time, subtract the session start time from a first thumbnail position in the thumbnail timing elements, divide a subtraction result by a thumbnail interval in the thumbnail timing elements, determine a first thumbnail name for the session, and determine the name for the requested thumbnail based on the first thumbnail name for the session. In implementations, the client is configured to determine a session start time relative to a reference time, determine an offset based on the session start time and a thumbnail interval in the thumbnail timing elements, determine a first thumbnail position for the session based on the offset for the session and the start time for the session, determine a first thumbnail name for the first thumbnail position for the session, and determine the name for the requested thumbnail based on the first thumbnail.

Disclosed is a method for generating, providing, or using common thumbnails per content source for use across multiple streaming sessions. In implementations, a method for common thumbnails usage includes sending, by a streaming system, thumbnail synchronization information associated with thumbnails in response to a stream request received from a client for a content source, wherein the thumbnails are stored based on a live stream of the content source, and each thumbnail has a thumbnail time and name, and sending, by the streaming system to the client, a requested thumbnail during the stream, wherein the requested thumbnail is selected from the thumbnails using a name based on the thumbnail synchronization information.

In implementations, the method further includes retrieving, by the streaming system from storage, the requested thumbnail using the name based on the thumbnail synchronization information. In implementations, the thumbnail synchronization information includes an offset-based parameter and a thumbnail interval. In implementations, the offset-based parameter is a live stream offset which is based on a live stream start time and the thumbnail interval. In implementations, the offset-based parameter is a stream start time associated with the stream request. In implementations, the thumbnail synchronization information is sent via at least one of a manifest and an application programming interface (API) call.

Although some embodiments herein refer to methods, it will be appreciated by one skilled in the art that they may also be embodied as a system or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects may take the form of a computer program product embodied in one or more the computer readable mediums having the computer readable program code embodied thereon. For example, the computer readable mediums can be non-transitory. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

As used herein, the term "computer-readable medium" encompasses one or more computer-readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

Computer program code for carrying out operations for aspects may be written in any combination of one or more programming languages, including an object-oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described herein with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for common thumbnails usage, the method comprising:
    pre-generating, by a streaming system, thumbnails for a live stream from a content source, wherein each thumbnail has a thumbnail time and name;
    sending, by the streaming system, thumbnail synchronization information associated with the thumbnails in response to a stream request received from a client for the content source; and
    sending, by the streaming system to the client, a requested thumbnail during the stream, wherein the requested thumbnail is selected from the thumbnails using a name based on the thumbnail synchronization information.

2. The method of claim 1, wherein the pre-generating further comprises:
    determining, by the streaming system, a live stream offset based on a live stream start time and a thumbnail interval;
    determining, by the streaming system, a first thumbnail time based on the live stream offset for a first thumbnail of the thumbnails; and
    determining, by the streaming system, a first thumbnail name corresponding to the first thumbnail time,
    wherein the thumbnail synchronization information includes the first thumbnail time, the first thumbnail name, and the thumbnail interval.

3. The method of claim 2, further comprising:
    determining, by the streaming system, the live stream start time relative to a reference time.

4. The method of claim 1, wherein the thumbnail synchronization information includes an offset-based parameter and a thumbnail interval.

5. The method of claim 4, wherein the offset-based parameter is a live stream offset which is based on a live stream start time and the thumbnail interval.

6. The method of claim 4, wherein the offset-based parameter is a stream start time associated with the stream request.

7. The method of claim 1, wherein the thumbnail synchronization information is sent via a manifest.

8. The method of claim 1, wherein the thumbnail synchronization information is sent via an application programming interface (API) call.

9. The method of claim 1, wherein the requested thumbnail is determined by:
    determining a stream start time associated with the stream request;
    subtracting the stream start time from a first thumbnail time sent in the thumbnail synchronization information;
    dividing a subtraction result by a thumbnail interval sent in the thumbnail synchronization information;
    determining a first thumbnail name associated with the stream request; and
    determining the name for the requested thumbnail based on the first thumbnail name associated with the stream request.

10. The method of claim 1, wherein the requested thumbnail is determined by:
    determining a stream start time associated with the stream request relative to a reference time;
    determining a stream offset based on the stream start time associated with the stream request and a thumbnail interval sent in the thumbnail synchronization information;
    determining a first thumbnail position associated with the stream request based on the stream offset and the stream start time associated with the stream request;
    determining a first thumbnail name associated with the stream request for the first thumbnail position associated with the stream request; and
    determining the name for the requested thumbnail based on the first thumbnail name associated with the stream request.

11. A streaming system, comprising:
    a live stream packager configured to pre-generate thumbnails for a live stream of content;

a storage configured to store the pre-generated thumbnails, wherein each thumbnail has a thumbnail time and name; and a just-in-time packager configured to:
send, in response to receiving a request for a session for the content from a client, thumbnail timing elements associated with the thumbnails; and
send, to the client, a requested thumbnail during the session, the requested thumbnail selected from the stored pre-generated thumbnails using a name based on the thumbnail timing elements.

12. The streaming system of claim 11, the live stream packager further configured to:
determine an offset based on a start time for the live stream and a thumbnail interval;
determine, for a first thumbnail of the pre-generated thumbnails, a first thumbnail position based on the offset; and
determine a first thumbnail name corresponding to the first thumbnail position,
wherein the thumbnail timing elements includes the first thumbnail position, the first thumbnail name, and the thumbnail interval.

13. The streaming system of claim 12, the live stream packager further configured to:
determine the start time relative to a reference time.

14. The streaming system of claim 11, wherein the thumbnail timing elements includes an offset-based parameter and a thumbnail interval.

15. The streaming system of claim 14, wherein the offset-based parameter is an offset which is based on a live stream start time and the thumbnail interval.

16. The streaming system of claim 14, wherein the offset-based parameter is a start time associated with the session.

17. The streaming system of claim 11, wherein the thumbnail timing elements are sent via a manifest.

18. The streaming system of claim 11, wherein the thumbnail timing elements are sent via an application programming interface (API) call.

19. The streaming system of claim 11, wherein the client is configured to:
determine a session start time;
subtract the session start time from a first thumbnail position in the thumbnail timing elements;
divide a subtraction result by a thumbnail interval in the thumbnail timing elements;
determine a first thumbnail name for the session; and
determine the name for the requested thumbnail based on the first thumbnail name for the session.

20. The streaming system of claim 11, wherein the client is configured to:
determine a session start time relative to a reference time;
determine an offset based on the session start time and a thumbnail interval in the thumbnail timing elements;
determine a first thumbnail position for the session based on the offset for the session and the start time for the session;
determine a first thumbnail name for the first thumbnail position for the session; and
determine the name for the requested thumbnail based on the first thumbnail.

21. A method for common thumbnails usage, the method comprising:
sending, by a streaming system, thumbnail synchronization information associated with thumbnails in response to a stream request received from a client for a content source, wherein the thumbnails are stored based on a live stream of the content source, and each thumbnail has a thumbnail time and name; and
sending, by the streaming system to the client, a requested thumbnail during the stream, wherein the requested thumbnail is selected from the thumbnails using a name based on the thumbnail synchronization information.

22. The method of claim 21, further comprising:
retrieving, by the streaming system from storage, the requested thumbnail using the name based on the thumbnail synchronization information.

23. The method of claim 21, wherein the thumbnail synchronization information includes an offset-based parameter and a thumbnail interval.

24. The method of claim 23, wherein the offset-based parameter is a live stream offset which is based on a live stream start time and the thumbnail interval.

25. The method of claim 23, wherein the offset-based parameter is a stream start time associated with the stream request.

26. The method of claim 21, wherein the thumbnail synchronization information is sent via at least one of a manifest and an application programming interface (API) call.

* * * * *